United States Patent [19]
Lindenmeier et al.

[11] Patent Number: 5,926,141
[45] Date of Patent: Jul. 20, 1999

[54] WINDOWPANE ANTENNA WITH TRANSPARENT CONDUCTIVE LAYER

[75] Inventors: Heinz Lindenmeier, Planegg; Jochen Hopf, Haar; Leopold Reiter, Gilching, all of Germany

[73] Assignee: FUBA Automotive GmbH, Salzdetfurth, Germany

[21] Appl. No.: 08/909,998

[22] Filed: Aug. 12, 1997

Related U.S. Application Data

[30] Foreign Application Priority Data

Aug. 16, 1996 [DE] Germany .............. 196 33 100
Jul. 16, 1997 [DE] Germany .............. 197 35 395

[51] Int. Cl.$^6$ .................................................. H01Q 1/32
[52] U.S. Cl. ................... 343/713; 343/704; 343/712
[58] Field of Search ................. 343/713, 704, 343/711, 712, 906; H01Q 1/32

[56] References Cited

U.S. PATENT DOCUMENTS 4,768,037 8/1988 Inaba et al. ............... 343/713
5,748,155 5/1998 Kadunce et al. ........... 343/713

FOREIGN PATENT DOCUMENTS 3721934 1/1988 Germany .

*Primary Examiner*—Hoanganh Le
*Attorney, Agent, or Firm*—Collard & Roe, P.C.

[57] ABSTRACT

An antenna for a windowpane or windshield, comprising a thin, electrically conductive layer flatly applied to an area of the windowpane. The layer is transparent to light and capable of reducing the transmission of heat through the windowpane, and creates a low-conductive area having non-negligible surface resistivity on the windowpane. Also provided is a substantially flat electrode made of highly conductive material, which is high-frequency connected with a reduced high frequency loss connected at at least one edge of said low-conductive layer, and also capacitively connected at high frequencies to an antenna connection point. The electrode is sufficiently long so as to minimize the loss created by the edge of the low-conductive layer. The low-conductive layer can also be sandwiched between glass panels such as in automotive safety glass and an additional electrode can be capacitively coupled to the main electrode. Multiple electrodes can also be disposed on the windowpane for receiving a diversity of frequencies.

31 Claims, 5 Drawing Sheets

WINDOWPANE ANTENNA WITH TRANSPARENT CONDUCTIVE LAYER

BACKGROUND OF THE INVENTION

1. Field of the Invention

This invention relates to a windowpane or windshield antenna, having a thin, electrically conductive layer flatly applied to an area of the windowpane, which is transparent to light, but reduces the transmission of heat.

In the invention, the conductive area is mounted on the windowpane, and is either directly applied to the window glass, or embedded between two layers of glass to form a composite or safety glass pane. A thin foil may serve as carrier of the conductive layer. This foil may be embedded between the glass panels of the composite or safety glass pane. When this layer is used as the main element of an antenna, it is desirable to use layers with the lowest possible surface resistivity. The lower the surface resistivity of the conductive areas formed by extremely thin metal and metal oxide layers, the higher the light-absorbing effect in the visible area. However, conductive layers with sufficiently high transparency cannot be realized with a surface resistivity of highly conductive materials such as copper or silver. These materials have a surface resistivity around 0.25 milliohm, which is lower by many orders of magnitude.

2. The Prior Art

Antennas of this type are preferably used in motor vehicle windshields where the conductive layer should be kept as transparent as possible. For this reason, the surface resistivity of the conductive layer must not be below 5 ohms. Antennas of this type are preferably used as radio reception antennas in the long, medium and short wave, VHF and UHF frequency ranges.

German Patent No. 37 21 934 A1 describes an antenna which uses a relatively low-resistive conductive layer. However, if antennas of the prior art are designed with layers of higher resistivity with better transparency, the antenna losses are relatively high, which results in comparatively low antenna capability. Such antenna losses have highly adverse effects, especially in the meter and decimeter (VHF) ranges.

SUMMARY OF THE INVENTION

It is therefore an object of the present invention to provide a windshield antenna, which avoids the loss of capacitance caused by limited conductivity in its conductive area.

Antennas according to the prior art have point-like contacts for connecting them to the area of limited conductivity formed by the conductive layer. High antenna current densities are thus produced within the zone of these contacts. These current densities contribute substantially to the antenna losses on the glass surface due to limited conductivity. The antenna according to the invention avoids this drawback through a suitable embodiment of a connection electrode.

The present invention provides an antenna for a windowpane or windshield, comprising a thin, electrically conductive layer flatly applied to an area of the window. The layer is transparent to light, is capable of reducing the transmission of heat through the windowpane, and creates a low-conductive area having non-negligible surface resistivity on the windowpane. Also provided is a substantially flat electrode made of highly conductive material, which is high-frequency connected with a reduced high-frequency loss at at least one edge to the low-conductive area, and also high frequency connected to an antenna connection point. The electrode has a length sufficiently large so as to minimize the loss created by the edge of the low-conductive area.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1A:
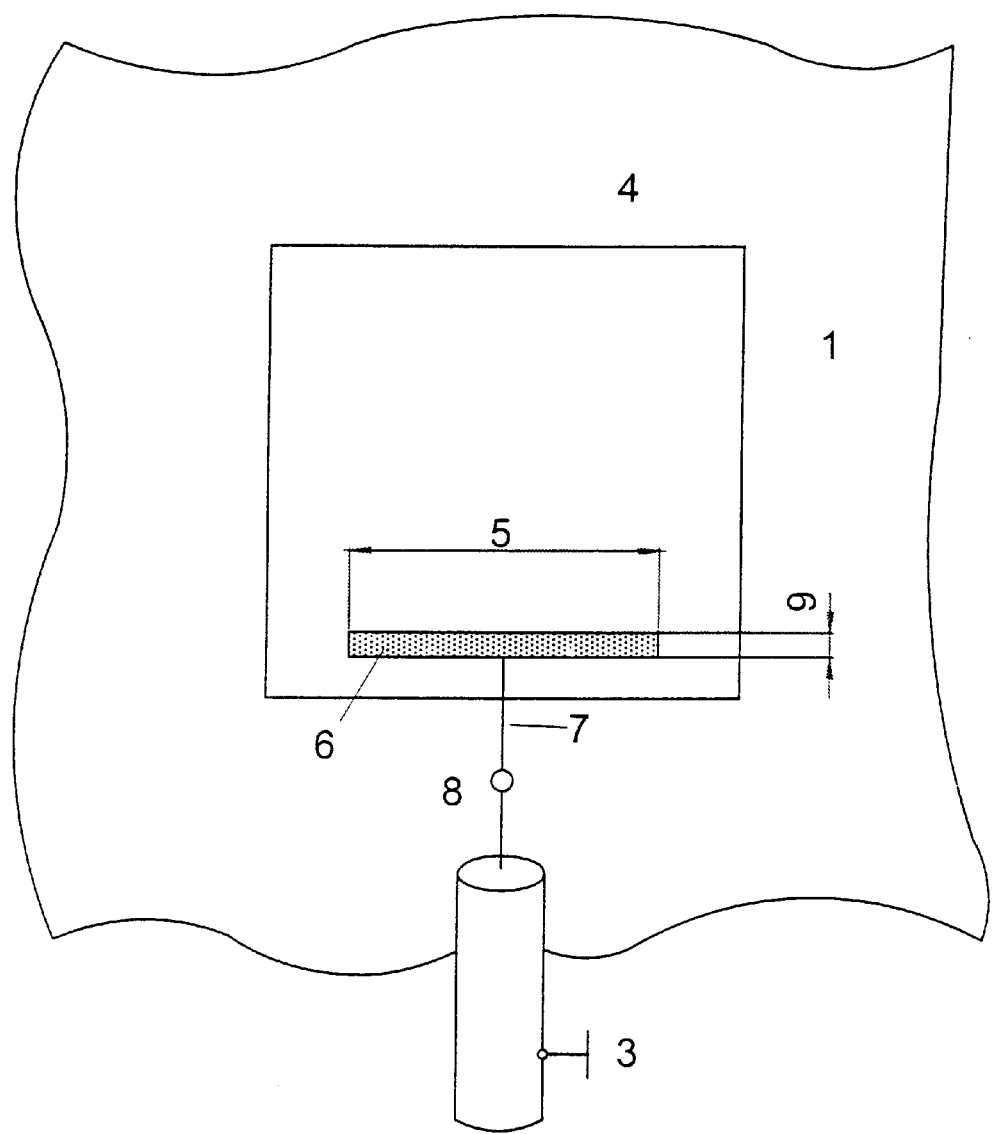
FIG. 1a shows an antenna according to the invention having an area with limited conductivity disposed on a windowpane with an elongated electrode made of highly conductive material.
Figure 1B:
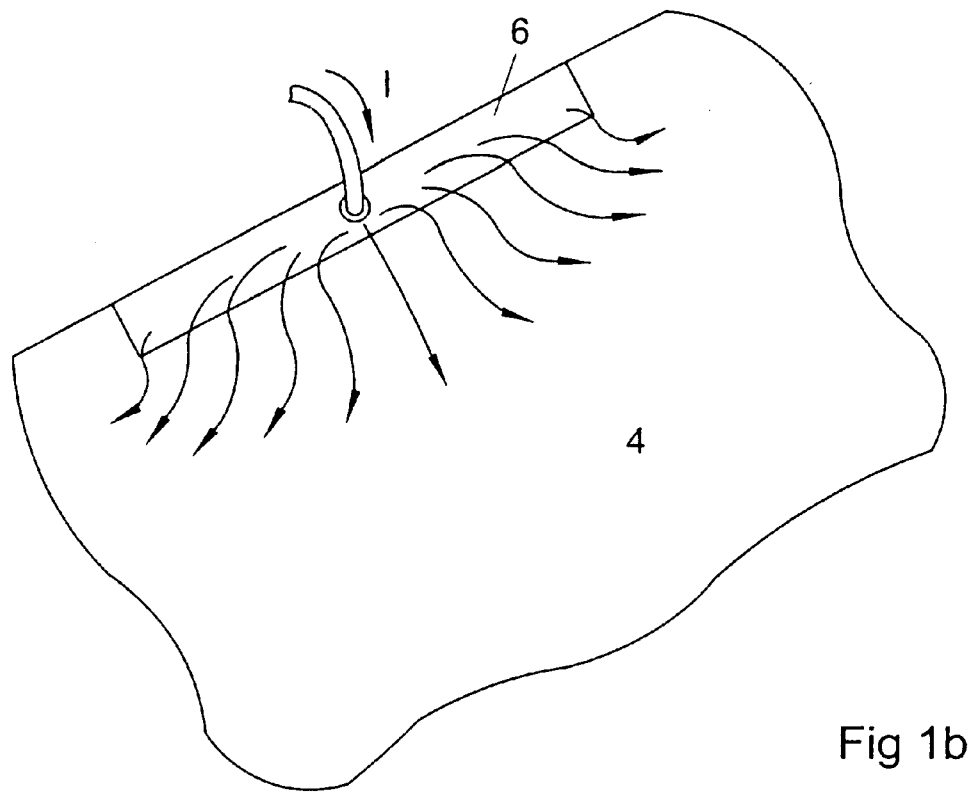
FIG. 1b shows the mode of operation of an antenna electrode according to the invention, with distributed current lines as shown, for avoiding current concentrations over a larger area with limited conductivity.
Figure 1C:
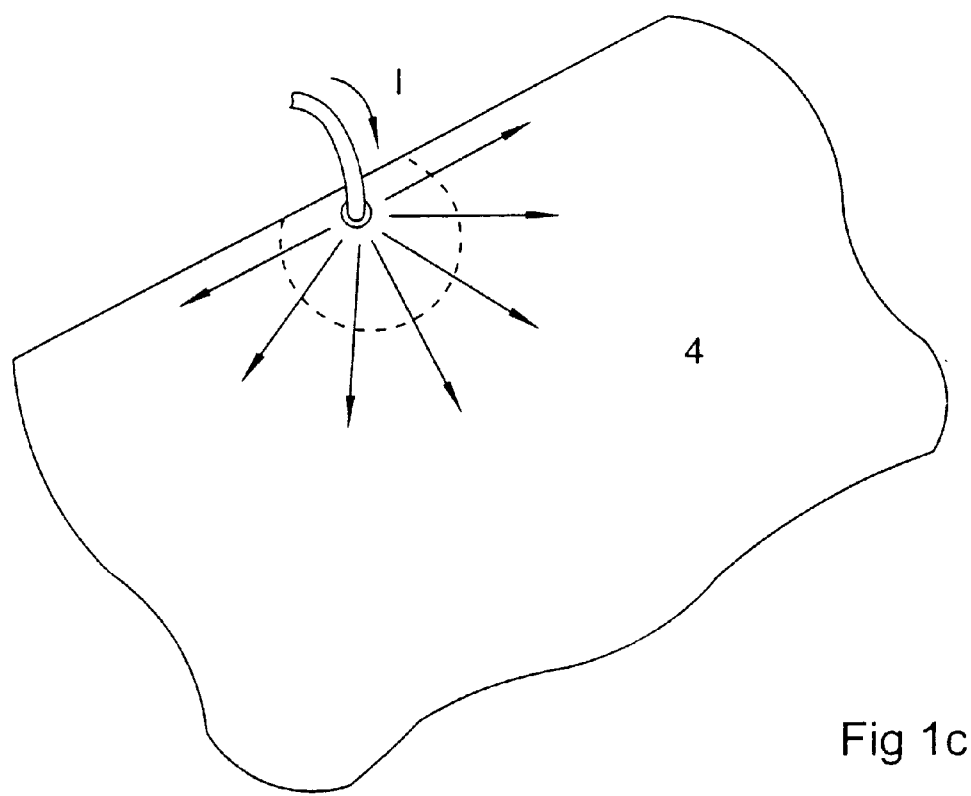
FIG. 1c shows a low conductive area and point-like contact according to the state of the art, showing current line concentrations near the point-like contact, and showing an area of particularly high contribution to loss by the dashed line.

Referring to FIG. 1a, there is shown an antenna having an elongated electrode 6 made of highly conductive material having an electrode length 5, a width 9, and an antenna connection point 8. A coax cable having a grounded shield 3 connects to point 8. Along the margins, high frequency contact is established with a low-conductive area 4, which prevents any concentration of current. This is shown in FIG. 1b, where the indicated current lines show that the total current 1 supplied to electrode 6 via the connection point 8 is almost uniformly distributed via the highly conductive electrode 6 and admitted into low-conductive area 4, thus avoiding high current densities. In contrast to the above, a point-like connection such as the one in FIG. 1c, shows high current densities within the vicinity of the point-like connection, thus causing high contribution to loss from the proximity of the connection as defined by the dashed line.

Figure 3:
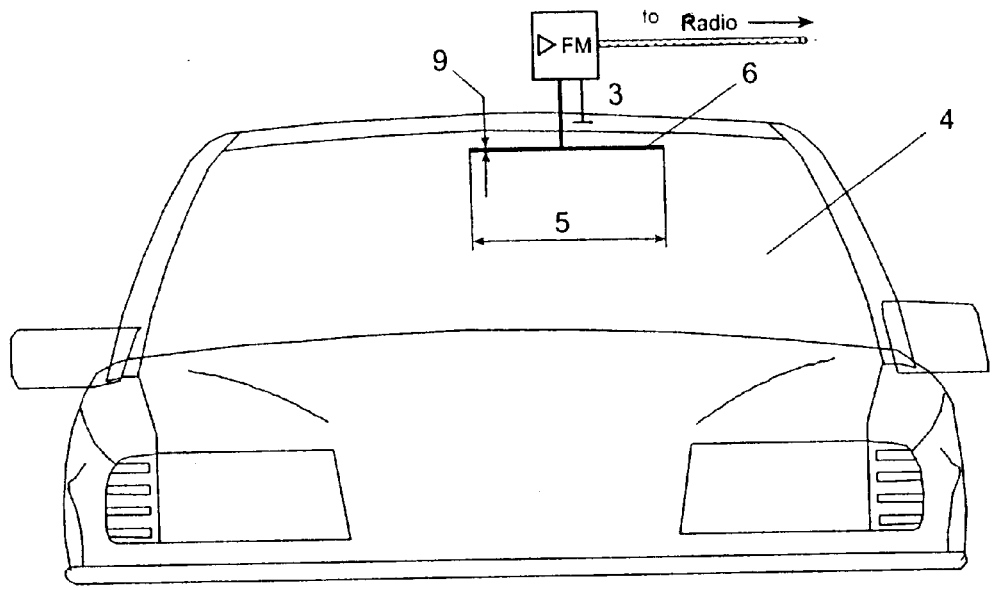
FIG. 3 shows a motor vehicle antenna according to the invention in the front windshield, with a strip-like electrode of a defined electrode length and width.

It has been confirmed in empirical tests that when an ultra-short wave antenna is designed as shown in FIG. 3, the optimal design length 5 of electrode 6 is approximately 30 cm or 12 inches. Width 9 of electrode 6, which is galvanically connected to low-conductivity window 4 in the present case, can be varied within wide limits. However, this width should not be excessively small, so that its own inductance will be too low. An electrode width 9 of about 5 mm has been found to be suitable. When designing motor vehicle antennas, it is always necessary to take into account that the electrodes, for aesthetic reasons, should be covered by the black print usually located along the edge of the pane. This means that the low-conductive area should be designed so that it covers the entire range of sight, and ends within the back print, where it is contacted by the electrode.

Preferably, the space between the edge of low-conductive area 4 and the conductive window frame 2 should be made as large as possible. Because of the limited width of the black print, the width 9 of electrode 6 should be as large as electrically required for coupling with low-conductive area 4, but not excessively large in order to maintain the largest possible spacing from the conductive window frame 2. An antenna such as the one shown in FIG. 3 can be used for a long, medium and short wave signals, as long as low-conductive window area 4 is not at any point galvanically or capacitively connected to conductive window frame 2 with excessively low resistivity. Therefore, low-conductive area 4 coupled to electrode 6 according to the invention can also be designed as a long, medium and short wave antenna, allowing it to be used for television and audio reception.

Figure 4:
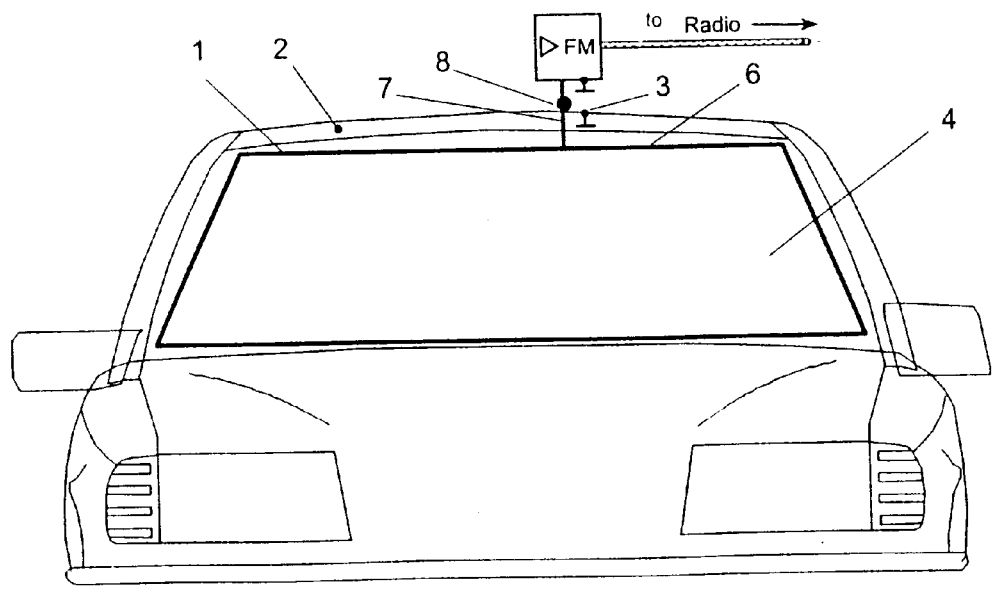
FIG. 4 shows an antenna in the front windshield of a motor vehicle, with strip-like electrode serving as a frame for the entire window opening.

According to a particularly advantageous embodiment of the invention, electrode 6 can be designed in the form of a frame, as shown in FIG. 4. This avoids particularly high losses, especially when layers are used with higher resistivity than low-conductive area 4.

Figure 5A:
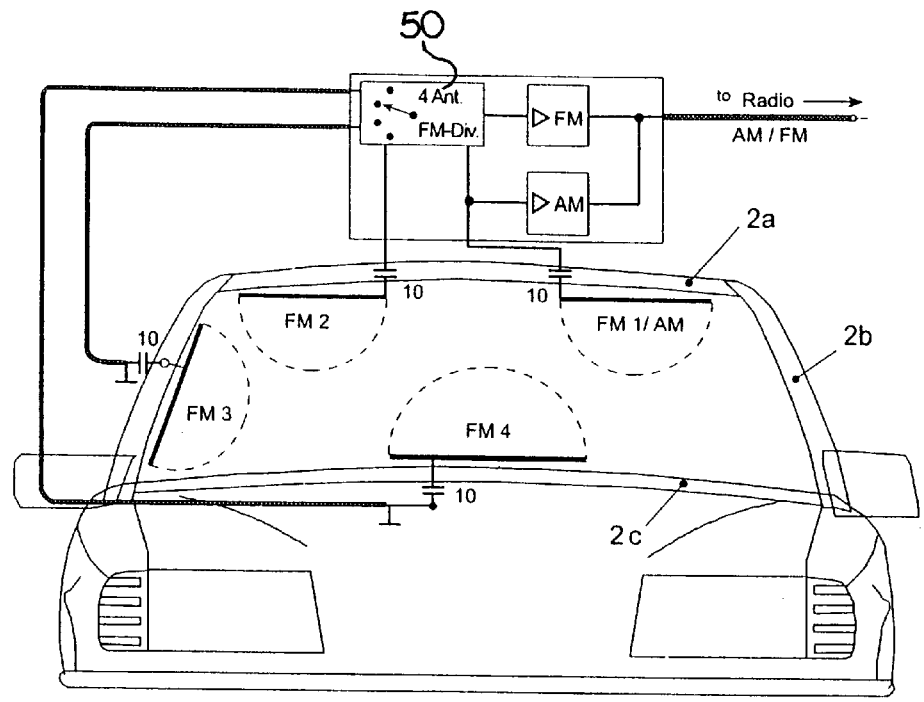
FIG. 5a shows a radio reception antenna system on a windshield with three separate antennas for ultra-short wave diversity, and the effective areas of the individual antennas are defined by the dashed lines.

The limited conductivity of layer 4 can be used to form individual antennas that are partly decoupled from each other. As shown in FIG. 5a, antennas are formed so they are separated from one another. The main field of activity of each antenna is defined by the dashed line. For ultra-short wave application, electrodes 6 each have a length of approximately 30 cm. The diversity effect results from the distribution of electrodes 6 over the circumference of the conductive window frame 2a, 2b and 2c. It was found that decoupling near the lower horizontal part 2c of the window frame preferably absorbs the vertical components of the electrical field. Antennas near the upper horizontal part 2a and close to the vertical struts 2b preferably absorbs the horizontal components of the electrical field. The individual antennas FM 1/AM, FM2, FM3, and FM4 are capacitively coupled to an antenna switch 50, which is in turn connected to AM and FM receivers. Thus, an effective diversity reception installation can be formed with the antenna system shown in FIG. 5a.

The decoupling of long, medium and short wave signals can take place on one of the antennas. However, effective antenna loads in the long, medium and short wave ranges must be kept as low as possible by loading the low-conductive area 4 using the ultra-short wave connections of the diversity system. This is accomplished by capacitors 10 as shown in FIG. 5a, connecting the diversity system to the antennas. Their capacitance value must be sufficiently high so as to provide an adequately low reactance for the higher frequencies. However, the sum of capacitors capacitively loads area 4 for the long, medium and short wave frequency ranges and reduces the LMS or AM-signal. Within a limited frequency range, such as for example in the ultra-short wave range, it is possible to partially compensate for the capacitive reactance by using a series-connected inductance, so that lower capacitive values can be used.

Figure 2A:
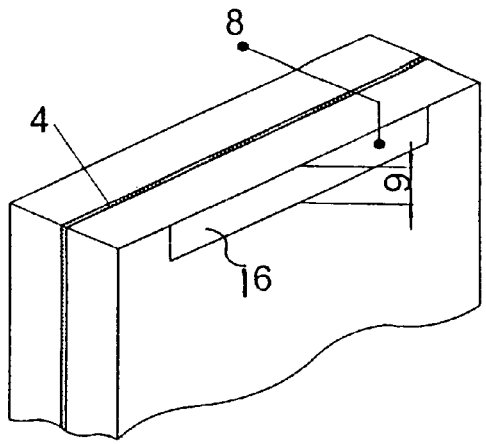
FIG. 2a shows a composite glass pane with an embedded low-conductive area, and having capacitively coupled electrode on one of its outer glass surfaces, with an antenna connection point.
Figure 2B:
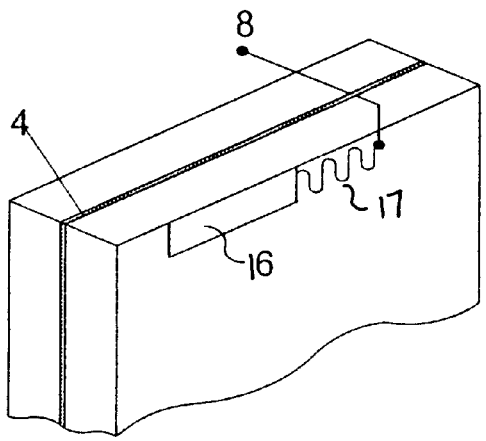
FIG. 2b shows an electrode as in FIG. 2a, but with a meandering inductance for partly compensating for the capacitive reactance within a limited reception frequency range.
Figure 2C:
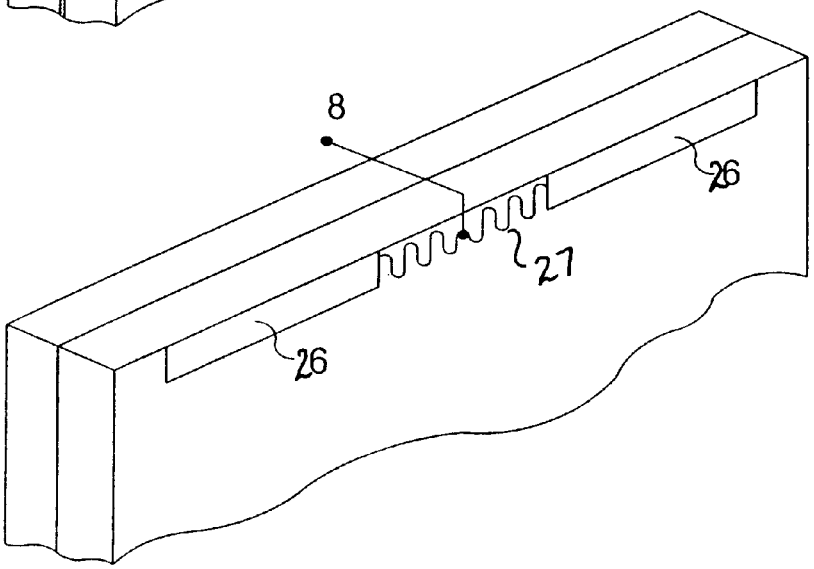
FIG. 2c shows electrode with capacitive coupling as in FIG. 2b, with inductors with a selectable antenna connection point on the electrode.

Capacitive coupling with low conductive layer 4 can be accomplished by embedding the layer between the panes of the composite glass, and printing a strip-like electrode 16 into the side of the composite glass facing the interior of the vehicle, and then coupling the electrode to this area as shown in FIGS. 2a, 2b or 2c.

In FIG. 2b, an inductor 17 is provided for partly compensating for the capacitive reactance of capacitor 10 and can be printed onto the surface of the glass as well. This can be done as shown in FIG. 2b by providing the inductor at one end of electrode 16.

As shown in FIG. 2c, electrode 26 is divided so as to provide an inductor 27 in the middle portion. Thus, it is possible to fine tune the antenna by selecting a connection point 8 along the length of inductor 27 to compensate for the capacitance of the circuit.

Figure 5B:
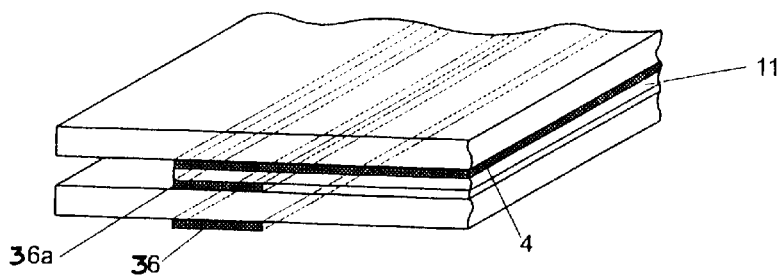
FIG. 5b shows a composite or safety glass pane with a low conductive embedded area, with an additional electrode capacitively coupled in a thin plastic sheet.

FIG. 5b shows a composite glass pane with a low-conductive embedded area 4, and an additional electrode 36a added thereto. Electrode 36a is capacitively coupled via a thin plastic sheet 11, or galvanically coupled with an additional electrode 36a on one of the outer surfaces of the glass opposite the conductive surface for forming the electrode 6 consisting of a conductive area having substantially the same form as additional electrode 36a.

Figure 5C:
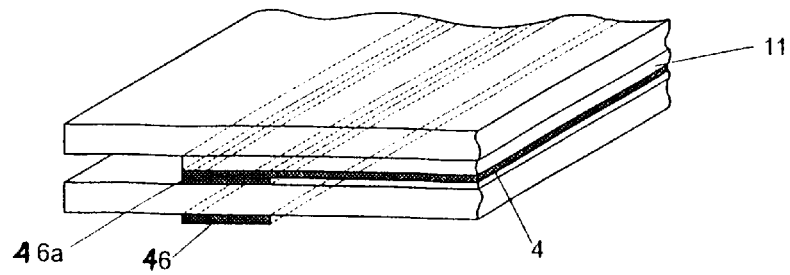
FIG. 5c shows a composite glass pane wherein an additional electrode rests directly on a low conductive area so that a galvanic contact is established.

According to another embodiment of the invention, it is possible to further reduce the remaining coupling losses by providing an electrode 16 as shown in FIG. 2a or 2b on one of the outer surfaces of a composite glass windowpane with capacitive coupling to low-conductive area 4. Moreover, losses can also be reduced when an additional electrode, such as electrode 36a is provided in the embodiment of FIG. 5b. Electrode 36a adjoins the glass composite, or is mounted on an inner surface of the glass opposite electrode 36 for the purpose of forming a capacitor. Advantageously, additional electrode 36a is designed in the form of a conductive area having substantially the same contour as electrode 36. As seen in FIG. 5b, a thin foil may be present between additional electrode 36a and low-conductive area 4. This foil should not noticeably reduce the effective capacitance between additional electrode 36a and electrode 36. It is, therefore, particularly advantageous if, as shown in FIG. 5c, an additional electrode 46a rests directly on low-conductive area 4, opposite electrode 46, so that a galvanic contact is established.

Accordingly, while several embodiments of the present invention have been shown and described, it is obvious that many changes and modifications may be made thereunto without departing from the spirit and scope of the invention according to the appended claims.

What is claimed is:

1. An antenna for mounting on a windowpane having at least two glass panels, comprising:
   a thin, electrically low conductive layer, embedded between the at least two panels of the windowpane, each panel having an outer surface, said layer being transparent to light and capable of reducing the transmission of heat through the windowpane, said layer creating a low-conductive area having non-negligible surface resistivity on the windowpane;

at least one substantially flat first electrode made of highly conductive material and mounted on one of said two outer surfaces of said glass panels, extending substantially parallel and adjacent with at least one edge of said thin low conductive layer, wherein said surface resistivity of said highly conductive material is several orders of magnitude lower than that of said low conductive material, thus forming a capacitive coupling between said layer and said first electrode; and an antenna connection point, high frequency coupled to said flat first electrode.

2. The antenna according to claim 1, further comprising a dielectrically active layer made from a material selected from the group consisting of plastic sheets and glass, said dielectrically active layer having two surfaces, wherein said low conductive layer and said first electrode are applied to different surfaces of said dielectrically active layer, wherein said high frequency connection between said first electrode and said low conductive layer is made capacitively, and wherein the width of said first electrode is sufficiently long so as to create a capacitive connection of sufficiently low resistance.

3. The antenna according to claim 2, wherein said electrode has a suitably small width and a predetermined length.

4. The windowpane antenna according to claim 4, wherein the specific surface resistivity of said low conductive layer is between 2 and 20 ohms, and wherein said first antenna electrode is formed on the outer surface of one of the glass panels, and comprising a second electrode which is embedded with said low conductive layer between the two panels of a composite glass windowpane opposite said first antenna electrode, said second electrode extending substantially parallel to the edge of said low-conductive layer, a thin plastic sheet disposed between the two glass panels, the high-frequency connection of said second electrode to the low-conductive layer being made capacitively, wherein the high frequency connection to said second electrode is made capacitively by connecting said antenna connection point to said first antenna electrode mounted on the outer surface of the glass panel, said second electrode having a conductive surface substantially the same shape as said first electrode and mounted opposite thereof so that said first and said second electrodes are capacitively coupled to each other at high frequencies through the glass panel.

5. The antenna according to claim 4, wherein said substantially flat first electrode further comprises:

a plurality of substantially flat first electrodes, made of highly conductive material, said first electrodes are separated from each other and distributed on the outer surface of and around the circumference of the windowpane of a motor vehicle having a conductive window frame, to form a plurality of diversity antennas, each of said first electrodes having an antenna connection point, and further comprising a plurality of grounding points located on the conductive window frame, each grounding point being adjacent an antenna connection point.

6. The antenna according to claim 4, wherein said first electrode is attached to the windowpane as an imprint.

7. The antenna according to claim 4, wherein said first electrode further comprises an inductor attached to the windowpane as an imprint.

8. The antenna according to claim 7, wherein said inductor is disposed in the middle portion of said first electrode.

9. The antenna according to claim 7, wherein said connection point is coupled to said induction at a location so as to minimize the capacitive effect of said first electrode and said window frame.

10. The antenna according to claim 2, further comprising:

a second electrode disposed between the two glass panels of the composite windowpane, wherein said second electrode extends substantially parallel with an edge of said low conductive layer and is disposed between said high conductive first electrode and said low conductive layer's edge, said second electrode is in contact with said low conductive layer.

11. The antenna according to claim 10, wherein said low conductive layer has a specific surface resistivity of between 3 and 20 ohms, and wherein said first electrode has a length greater than 5 cm and a width between 5 and 10 mm.

12. The antenna according to claim 10, wherein said first electrode further comprises an inductor attached to the windowpane as an imprint.

13. The antenna according to claim 12, wherein said inductor is disposed in the middle portion of said first electrode.

14. The antenna according to claim 12, wherein said connection point is coupled to said induction at a location so as to minimize the capacitive effect of said first electrode and said window frame.

15. The antenna according to claim 10, wherein said first electrode is attached to the windowpane as an imprint.

16. The antenna according to claim 10, wherein said substantially flat first electrode further comprises:

a plurality of substantially flat first electrodes, made of highly conductive material, said first electrodes are separated from each other and distributed on the outer surface of and around the circumference of the windowpane of a motor vehicle having a conductive window frame, to form a plurality of diversity antennas, each of said first electrodes having an antenna connection point, and further comprising a plurality of grounding points located on the conductive window frame, each grounding point being adjacent an antenna connection point.

17. The windowpane antenna according to claim 1, wherein said low conductive layer has a specific surface resistivity of between 3 and 20 ohms and is embedded together with a second electrode between the two glass panels of a composite windowpane, wherein said second electrode extends substantially parallel with an edge of said low conductive layer and is disposed between said high conductive first electrode and said low conductive layer's edge, and further comprising a connection for said electrode outside of the composite windowpane and a thin plastic sheet applied to the composite windowpane for creating an electrical coupling between said second electrode and said low conductive layer.

18. An antenna for mounting on a windowpane having one or more glass panels, comprising:

a thin, electrically low conductive layer flatly applied to an area of the windowpane of a motor vehicle, wherein said motor vehicle has an electrically conductive body, a conductive window frame, and black print delineating view boundaries of the windshield, said layer being transparent to light and capable of reducing the transmission of heat through the windowpane, said layer creating a low-conductive area having non-negligible surface resistivity on the windowpane, wherein said low conductive layer covers the view boundaries and extends under and parallel to said black print, and wherein the edge of said low conductive layer is spaced as far as possible from said window frame; and a plurality of substantially flat electrodes, made of highly conductive material, in contact with said low conductive layer, said electrodes are separated from each other and distributed around the circumference of said conductive window frame to form a plurality of diversity antennas, each of said electrodes having an antenna connection point, and further comprising a plurality of grounding points located on the conductive window frame, each grounding point being adjacent an antenna connection point, wherein said surface resistivity of said highly conductive material is several orders of magnitude lower than that of said low conductive material.

19. The antenna according to claim 18, wherein the antenna is mounted on the windshield of a motor vehicle for receiving radio and television audio signals.

20. The antenna according to claim 18, wherein said low conductive layer has a specific surface resistivity of between 5 and 10 ohms, and wherein said electrode has a length of between 20 and 30 cm for obtaining minimal losses in the ultra-short wave frequency band.

21. The antenna according to claim 18, wherein said electrode is in the form of a frame extending around the entire windowpane for obtaining minimal losses.

22. The antenna according to claim 18, wherein the window frame has an upper part, a lower part and two vertical parts, wherein the antenna is mounted on the front windshield of a motor vehicle and at least one of said diversity antennas is formed on each of the upper, lower and vertical parts of the window frame, and wherein said antenna connection points are positioned so as to obtain the highest possible diversity effect.

23. The antenna according to claim 18, wherein one of said antenna connection points is adapted to decouple long, medium and short wave signals, and wherein one capacitor is active at one time, wherein the reactance of said capacitor is low in the VHF and UHF ranges and the sum of the capacitive loads is as low as possible in the long, medium and short wave ranges.

24. The antenna according to claim 23, wherein one inductor is connected in series with said first electrode for reducing the required capacitance to partly compensate for the capacitive reactance.

25. An antenna for mounting on a windowpane having one or more glass panels, comprising:

a thin, electrically low conductive layer flatly applied to an area of the windowpane of a motor vehicle, wherein said motor vehicle has an electrically conductive body, a conductive window frame, and black print delineating view boundaries of the windshield, said layer being transparent to light and capable of reducing the transmission of heat through the windowpane, said layer creating a low-conductive area having non-negligible surface resistivity on the windowpane, wherein said low conductive layer covers the view boundaries and extends under and parallel to said black print, and wherein the edge of said low conductive layer is spaced as far as possible from said window frame; and a plurality of substantially flat electrodes, made of highly conductive material, capacitively connected to said low conductive layer, said electrodes are separated from each other and distributed around the circumference of said conductive window frame to form a plurality of diversity antennas, each of said electrodes having an antenna connection point, and further comprising a plurality of grounding points located on the conductive window frame, each grounding point being adjacent an antenna connection point, wherein said surface resistivity of said highly conductive material is several orders of magnitude lower than that of said low conductive material.

26. The antenna according to claim 25, wherein the antenna is mounted on the windshield of a motor vehicle for receiving radio and television audio signals.

27. The antenna according to claim 25, wherein said low conductive layer has a specific surface resistivity of between 5 and 10 ohms, and wherein said electrode has a length of between 20 and 30 cm for obtaining minimal losses in the ultra-short wave frequency band.

28. The antenna according to claim 25, wherein said electrode is in the form of a frame extending around the entire windowpane for obtaining minimal losses.

29. The antenna according to claim 25, wherein the window frame has an upper part, a lower part and two vertical parts, wherein the antenna is mounted on the front windshield of a motor vehicle and at least one of said diversity antennas is formed on each of the upper, lower and vertical parts of the window frame, and wherein said antenna connection points are positioned so as to obtain the highest possible diversity effect.

30. The antenna according to claim 25, wherein one of said antenna connection points is adapted to decouple long, medium and short wave signals, and wherein one capacitor is active at one time, wherein the reactance of said capacitor is low in the VHF and UHF ranges and the sum of the capacitive loads is as low as possible in the long, medium and short wave ranges.

31. The antenna according to claim 30, wherein one inductor is connected in series with said electrode for reducing the required capacitance to partly compensate for the capacitive reactance.

* * * * *